A. E. & H. F. VROOMAN & S. S. SWANSON.
ROTARY WEEDER AND CULTIVATOR.
APPLICATION FILED MAY 5, 1914.
1,141,997.
Patented June 8, 1915.
2 SHEETS—SHEET 1.
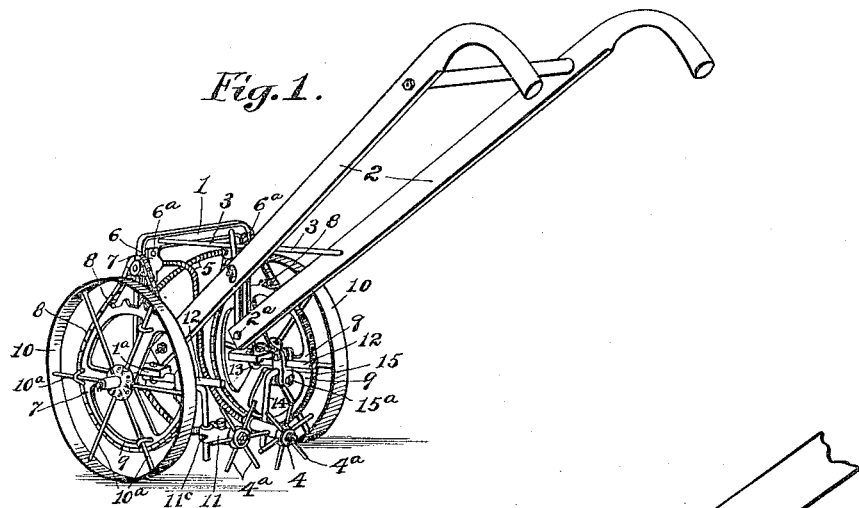
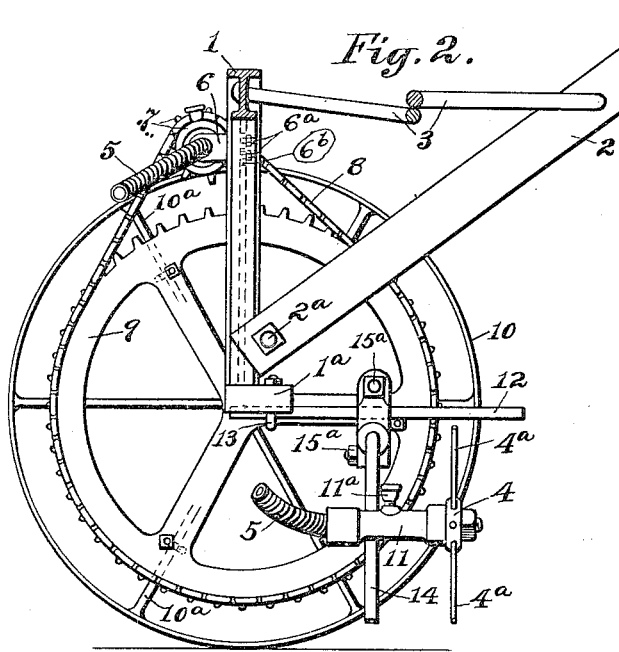

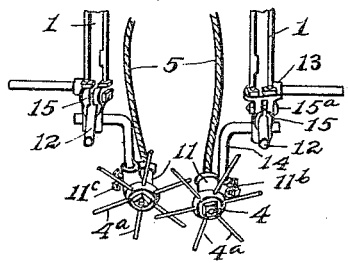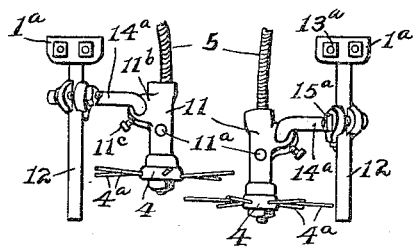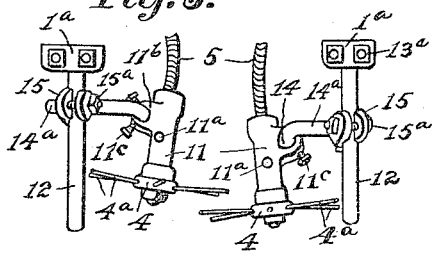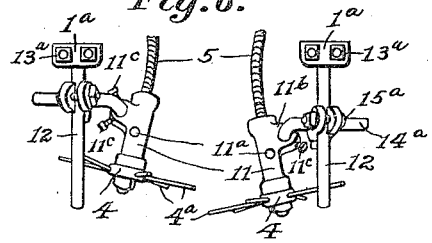

UNITED STATES PATENT OFFICE.

ARBA E. VROOMAN AND HOWARD F. VROOMAN, OF PAINESVILLE, AND STARLEY S. SWANSON, OF BELLEVUE, OHIO, ASSIGNORS TO THE VROOMAN COMPANY, OF BELLEVUE, OHIO, A CORPORATION OF OHIO.

ROTARY WEEDER AND CULTIVATOR.

1,141,997.  Specification of Letters Patent.  Patented June 8, 1915.

Application filed May 5, 1914. Serial No. 836,449.

*To all whom it may concern:*

Be it known that we, ARBA E. VROOMAN, HOWARD F. VROOMAN, and STARLEY S. SWANSON, citizens of the United States, said ARBA E. VROOMAN and HOWARD F. VROOMAN residing at Painesville and said STARLEY S. SWANSON residing at Bellevue, in the counties of Lake and Huron, respectively, and State of Ohio, have invented certain new and useful Improvements in Rotary Weeders and Cultivators, of which the following is a specification.

Our invention relates to improvements in rotary weeders and cultivators, the primary object being to provide a generally improved implement of this class of exceedingly simple, cheap and efficient construction better adapted to its intended purposes than any other device of this class or type with which we are acquainted.

The invention relates more particularly to improved rotary weeder or cultivator elements and means for adjusting the latter to meet the varying demands of actual service as well as the progressive stages of growth of the vegetable being cultivated, the present embodiment of this invention being particularly designed and adapted for use in the weeding or cultivation of onions and similar or analogous vegetables, the improved implement being adapted to straddle the rows of growing vegetables, whereby the rotary weeder and cultivator elements may be brought into close and proper proximity thereto for the purpose of mulching and cultivating the soil along and between the growing plants without in any way injuring the same, and at the same time destroying the sprouting and growing weeds without covering the growing plants or vegetables by the loosened soil.

A still further object is to provide means for mounting and adjusting the rotary weeder elements or members whereby the prongs thereof are adapted to revolve transversely to the line of travel or direction of the implement and at substantially right angles to the surface being cultivated, or in other words,—substantially parallel with and between the growing plants or vegetables thereby reducing the liability of injury of the latter to a minimum, means being provided whereby during the early or initial cultivation of the onions one of the rotary cultivator spider wheels or members may be placed slightly in advance of the other so that the radially extending weeder prongs thereof will overlap and extend into the row of growing vegetables thus enabling the soil in the row and between the growing plants to be stirred or mulched thereby destroying the sprouting or growing weeds between the plants. Practical experience with this instrument has demonstrated that this may be done during the initial cultivation of the early or initial growth of such vegetables as onions without in any way injuring the same, this being particularly due to the fact that such vegetables or plants are more deeply rooted and of a more hardy character than ordinary sprouting or growing weeds.

A still further object is to provide flexible driving shafts for carrying the rotary weeder elements together with means for supporting and adjusting the same laterally and longitudinally whereby the position of the rotary weeder prongs may be varied and placed at various angles of incidence to the surface being cultivated so as to meet the various requirements during the various stages of growth and cultivation of the growing crop.

With the above mentioned and other ends in view, the invention consists in the novel construction, arrangement, and combination of parts, hereinafter described, illustrated in one of its embodiments in the accompanying drawings, and particularly pointed out in the appended claims.

Referring to the drawings, forming a part of this specification Figure 1, is a perspective view of a rotary weeder and cultivator constructed in accordance with this invention. Fig. 2, an enlarged central longitudinal sectional view of the same, the rotary weeder element being slightly elevated above the surface being cultivated. Fig. 3, a detached view, partly in plan and partly in rear elevation showing the rotary elements or spider wheels set in overlapping relation to each other for the first or initial cultivation of the growing onions or plants. Fig. 4, a top plan view of the same. Fig. 5, a similar view showing the rotary weeder elements or spider wheels set in angular relation to each other for second or third cultivation. Fig. 6, a similar view showing the rotary weeder elements or spider wheels split apart and in proper angular relation to each other to throw the mulched soil up to the plants for the final cultivation of the same.

Similar numerals of reference designate like parts throughout all the figures of the drawings.

The frame of the improved cultivator, in the present instance, comprises an arched frame 1, having its vertically extending side members terminating in bearing brackets 1ª. The handles 2, are secured to the lower ends of the side members of the arched frame 1, by means of bolts 2ª, and are further secured to the frame by means of cross brace rods 3, extending in a substantially horizontal direction and secured, in the present instance, to the top or horizontally extending member of the frame 1, whereby the handles 2, are securely braced and maintained in proper relative position to the frame 1.

The rotary weeder elements or spider wheels preferably comprise hub members 4, carrying a plurality or series of radially extending weeder prongs 4ª.

As a means for providing for the various adjustments hereinafter described, as well as driving the rotary weeder elements or spider wheels in any of the various adjustments flexible driving shafts 5, are provided, said flexible shafts being preferably arranged in crossed relation to each other beneath the arched portion of the frame as shown, the upper outer ends of said flexible shafts 5, being mounted in bearings 6, secured near the upper ends of the side members of the frame 1, by means of adjusting bolts 6ª, extending through vertical slots 6ᵇ, (see Fig. 2) whereby said bearings may be adjusted vertically for the purposes hereinafter referred to.

As a means of driving the flexible shafts 5, the latter are provided at their upper ends with sprocket wheels 7, adapted to receive their motion through the medium of sprocket chains 8, mounted upon and driven by large sprocket wheels 9, the latter being removably mounted and secured to the inner sides of the cultivator wheels 10, by means of hooked clamping bolts 9ª, clamping, in the present instance, upon alternate spokes 10ª, of the wheels 10.

As a means of universally supporting, connecting and adjusting the rotary weeder elements or spider wheels 4, whereby the latter may not only be moved to any desired position or angle relative to each other but may be adjusted to any desired position or angle of incidence to the surface being cultivated the hub portions of the spider wheels are detachably and suitably connected to the lower ends of the flexible shafts 5, and are provided with suitable bearings mounted in bearing sleeves 11, the latter being provided with covered oil cups 11ª.

The universally adjustable bearing brackets comprise horizontally extending bracket rods 12, secured beneath and extending rearwardly from the bearing brackets 1ª, of the arch or yoke frame 1, said rods being adjustably clamped to the bearing brackets 1ª, by means of the U-shaped clamps 13, and nuts 13ª.

As a means of vertically adjusting the bearing sleeves 11, whereby the cultivator elements or spider wheels 4, may be adjusted vertically or to and from the surface being cultivated as well as permitting the bearing sleeves 11, to be adjusted horizontally for permitting the weeder prongs 4ª, to be adjusted or placed in angular relation to each other as illustrated in Figs. 5 and 6 of the drawings, vertically extending bracket rods 14, are provided the lower ends of said rods extending through bearing openings in bearings lugs 11ᵇ, formed at the sides of the bearing sleeves 11, said bearing sleeves being secured in any desired adjusted position by means of clamping bolts 11ᶜ.

As a means of adjusting the bracket rods 14, longitudinally and laterally relative to the bracket rods 12, as well as connecting said rods 12, and 14, in adjustable relation to each other clamp blocks 15, are provided said blocks being split or bifurcated at opposite ends provided with suitable recesses to receive and contain the rods 12, and 14, and being provided with clamping bolts 15ª, for clamping the rods 12, and 14, in any desired adjusted position. As a means for permitting the bracket rods 14, to be moved toward and from each other to vary the space between the bearing sleeves 11, and the flexible driving shafts and weeder elements carried thereby as illustrated in Figs. 4, 5 and 6 of the drawings the upper ends of the bracket rods 14, are bent into substantially horizontally extending portions 14ª, to pass through the lower ends of the clamp blocks 15, above described.

It will be seen that by reason of the construction, arrangement, and combination of the parts and features of construction included in the bearing brackets and the connections between the same and the bearing sleeves 11, carrying the lower ends of the flexible shafts and the rotary weeder elements or spider wheels universally adjustable bearing brackets or connections are provided whereby said rotary weeder elements or spider wheels may be adjusted to any desired position relative to each other and at any desired angle and position to the surface being cultivated to meet the various requirements during the various stages of the growth and cultivation of the growing crop as hereinbefore pointed out.

From the foregoing description, taken in connection with the accompanying drawings, the operation and advantages of our invention will be readily understood.

Having thus described one of the embodi- ments of our invention, what we claim and desire to secure by Letters Patent, is,—

1. A cultivator, comprising a frame, universally adjustable bearing brackets carried thereby, flexible driving shafts carried by some of said brackets and provided with rotary weeder elements, and supporting wheels operatively connected to said shafts.

2. In a cultivator, a frame, universally adjustable bearing bracket members carried thereby, driving shafts mounted on some of said bracket members, driving means for said shafts, and rotary weeder elements connected to and driven by said driving shafts.

3. A cultivator, comprising an arched frame, universally adjustable bearing brackets carried thereby, flexible driving shafts carried by said brackets, rotary weeder elements carried by said shafts, and supporting wheels operatively connected to the latter.

4. In a cultivator, a plurality of horizontally and vertically extending bracket rods adjustably connected to each other, bearing sleeves adjustably mounted on said vertically extending bracket rods, and driving shafts and rotary weeder elements carried by said bearing sleeves.

5. In a cultivator, a frame provided with longitudinally and vertically extending bracket rods, clamping members connecting same, flexible shafts vertically and laterally adjustable on said vertically extending bracket rods, and rotary weeder elements connected to said flexible shafts.

6. In a cultivator, the combination with a frame provided with driving wheels and having vertically extending adjustably mounted bracket rods; of flexible driving shafts operatively connected to said driving wheels and vertically and horizontally adjustable on said bracket rods, and rotary weeder members carried by said driving shafts.

7. A cultivator, comprising a frame, longitudinally and laterally adjustable bracket rods carried thereby, shaft bearing members vertically and laterally adjustable on some of said bracket rods, driving shafts carried by said shaft bearing members, rotary weeder members carried by said driving shafts, and supporting wheels on said frame operatively connected to said driving shafts.

8. A cultivator, comprising a frame, horizontally extending bracket rods carried thereby, vertically extending bracket rods adjustably connected to the latter, bearing sleeves vertically and horizontally adjustable on said vertically extending bracket rods, flexible driving shafts carried in said bearing sleeves, and rotary weeder elements carried by said flexible driving shafts.

9. In a cultivator, a frame provided with a pair of horizontally extending bracket rods, clamping blocks adjustably mounted thereon, a second pair of bracket rods adjustably mounted in said clamping blocks and depending therefrom, shaft carrying bearing members vertically and horizontally adjustable on said second pair of bracket rods, and flexible driving shafts carried by said shaft carrying bearing members and provided with rotary weeder elements.

10. A cultivator, comprising an arched frame provided at its top with a pair of vertically adjustable bearings, a pair of flexible driving shafts arranged in crossed relation to each other and having their upper ends mounted in said bearings, a plurality of universally adjustable bearing bracket members carried at the sides of said frame, some of said bearing members supporting the lower ends of said flexible shafts, rotary weeder elements detachably connected to and adapted to be driven by said flexible shafts, and supporting wheels on said frame operatively connected to the upper ends of said flexible shafts.

In testimony whereof we have affixed our signatures in presence of two witnesses.

ARBA E. VROOMAN.
HOWARD F. VROOMAN.

Witnesses:
  GUY WYMAN,
  MARIE DAYTON.

STARLEY S. SWANSON.

Witnesses:
  E. H. ERDRICH,
  E. M. KENNY.